United States Patent [19]

Ito et al.

[11] Patent Number: 4,723,862

[45] Date of Patent: Feb. 9, 1988

[54] CERAMIC-METAL JOINT STRUCTURE

[75] Inventors: Masaya Ito; Noboru Ishida, both of Aichi, Japan

[73] Assignee: NGK Spark Plug Co., Ltd., Aichi, Japan

[21] Appl. No.: 879,538

[22] Filed: Jun. 24, 1986

Related U.S. Application Data

[63] Continuation-in-part of Ser. No. 725,337, Apr. 19, 1985, abandoned.

[30] Foreign Application Priority Data

Apr. 20, 1984 [JP] Japan ............................ 59-80658

[51] Int. Cl.⁴ .......................................... F16B 11/00
[52] U.S. Cl. .................................. 403/272; 403/404; 416/241 B
[58] Field of Search ............... 403/404, 270, 271, 272, 403/28, 29, 30; 228/122, 121, 124, 189; 416/241 B, 244 A

[56] References Cited

U.S. PATENT DOCUMENTS

| | | | |
|---|---|---|---|
| 2,662,725 | 12/1953 | McVeigh | 403/404 X |
| 2,842,699 | 7/1958 | Germeshausen et al. | 403/272 X |
| 2,859,512 | 11/1958 | Dijksterhuis et al. | 228/122 |
| 2,882,116 | 4/1959 | Williams | 228/122 X |
| 3,055,465 | 9/1962 | Pulfrich | 403/30 |
| 3,091,028 | 5/1963 | Westbrook et al. | 228/122 |
| 3,284,118 | 11/1966 | Kessler, Jr. | 403/29 |
| 3,367,696 | 2/1968 | Langley | 403/28 X |
| 4,075,364 | 2/1978 | Panzera | 228/122 X |
| 4,167,351 | 9/1979 | Bindin | 403/404 X |
| 4,190,031 | 8/1978 | Marscher | 228/122 X |
| 4,196,309 | 4/1980 | Thomas | 403/272 X |
| 4,207,029 | 6/1980 | Ivanko | 416/241 B |
| 4,225,262 | 9/1980 | Koop et al. | 403/272 |
| 4,227,036 | 10/1980 | Fitzgerald | 403/30 X |
| 4,281,941 | 8/1981 | Rottenkolber | 403/404 X |
| 4,325,647 | 4/1982 | Maier et al. | 403/404 X |
| 4,362,471 | 12/1982 | Langer et al. | 416/241 B |
| 4,432,660 | 2/1984 | Norvell et al. | 403/29 |
| 4,485,545 | 12/1984 | Caverly | 403/28 X |
| 4,493,378 | 1/1985 | Kyle | 403/29 X |
| 4,557,704 | 12/1985 | Ito et al. | 416/241 B X |
| 4,614,453 | 9/1986 | Tsuno et al. | 403/404 X |

FOREIGN PATENT DOCUMENTS 203803 12/1982 Japan ............................ 416/241 B Primary Examiner—Dave W. Arola
Attorney, Agent, or Firm—Finnegan, Henderson, Farabow, Garrett and Dunner

[57] ABSTRACT

A power-transmitting ceramic to metal joint structure including a first shaft consisting essentially of a sintered ceramic material, one portion of the shaft defining a first mating surface; an intermediate insert consisting essentially of a sintered ceramic material, the insert having two opposite insert mating surfaces, the insert having a thickness between the opposite insert mating surfaces in the range of from about 1.5 to about 20% of a distance defined by the cross section of the first mating surface and a flexural strength of not less than about 70% of the sintered ceramic material comprising the first shaft; a second shaft consisting essentially of metal, one portion of the second shaft defining a second mating surface; and brazing filler means affixing the first mating surface to one of the insert mating surfaces and the second mating surface to the opposite insert mating surface, the aforementioned mating surfaces being affixed in abutting relationships. Preferably, the intermediate insert has a thermal expansion coefficient in the range from about that of the first shaft to about that of the second shaft.

12 Claims, 9 Drawing Figures

CERAMIC-METAL JOINT STRUCTURE

This application is a continuation-in-part of U.S. Pat. application Ser. No. 725,337, filed Apr. 19, 1985, now abandoned.

BACKGROUND OF THE INVENTION

The present invention relates to a ceramic-metal joint structure.

Joining ceramics to metals is difficult because the great thermal-expansion mismatch between ceramic and metal causes residual stresses to develop from thermal strain, leading to frequent failure in the ceramic part. Two techniques are currently employed in bonding ceramics to metals which do not cause failure of the ceramic; one is to use materials having similar thermal expansion coefficients such as alumina and Kovar (the trademark for a Co—Ni—Fe alloy) and the other method is to use a metal insert having a thermal expansion coefficient close to that of the ceramic.

These methods, however, are not suitable for use with ceramics such as silicon nitride having small thermal expansion coefficients. Tungsten is one of the metals having low thermal expansion coefficients but because of its high price and brittleness as well as its easily oxidizable nature, tungsten is not at all suitable for use as a mating metal or a metal insert with the small-expansion ceramic that could be used in those parts around an internal combustion engine which are exposed to high temperature and constant vibrations of high magnitude. It has therefore been desired to directly bond the low thermal expansion ceramics to ferrous or aluminum alloys.

In another method that is known in the art of ceramic-metal bonding, a mixture of ceramic and metal that exhibits a gradual change in thermal expansion coefficient is thermal-sprayed onto the mating surface of the ceramic, which is subsequently bonded to the metal by friction, compression or other suitable techniques. This method however is not highly efficient since it is quite difficult to produce a thermal-sprayed coat having a continuous profile of thermal expansion changes.

SUMMARY OF THE INVENTION

The primary object, therefore, of the present invention is to provide a ceramic-metal joint structure that ensures strong adhesion between ceramics having low thermal expansion coefficients and common metals such as ferrous and aluminum alloys.

In accordance with the above object, there has been provided a power-transmitting ceramic to metal joint structure including a first shaft consisting essentially of a sintered ceramic material, one portion of the shaft defining a first mating surface; an intermediate insert consisting essentially of a sintered ceramic material, the insert having two opposite insert mating surfaces, the insert having a thickness between the opposite insert mating surfaces in the range of from about 1.5 to about 20% of a distance defined by the cross section of the first mating surface and a flexural strength of not less than about 70% of the sintered ceramic material comprising the first shaft; a second shaft consisting essentially of metal, one portion of the second shaft defining a second mating surface; and brazing filler means affixing the first mating surface to one of the insert mating surfaces and the second mating surface to the opposite insert mating surface, the aforementioned mating surfaces being affixed in abutting relationships. Preferably, the intermediate insert has a thermal expansion coefficient in the range from about that of the first shaft to about that of the second shaft.

This object of the present invention can be achieved by a ceramic-metal joint structure wherein a ceramic sinter is brazed to a metal, with a thin sheet of sintered ceramic material that has a thickness equal to 1.5% or 20% of the width of the mating surfaces being inserted between the ceramic sinter and the metal.

DESCRIPTION OF THE PREFERRED EMBODIMENTS

Figure 1:
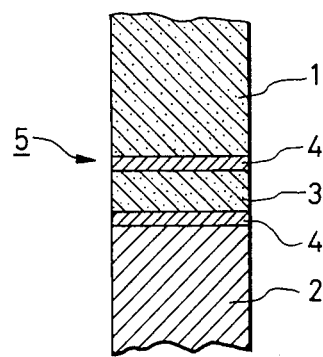
FIG. 1 is a cross section illustrating the structure of the joint prepared and tested in Example 1.

In accordance with the present invention, the thin sheet of a ceramic material inserted between a ceramic sinter and a metal is limited to 1.5% to 20% of the width of their mating surfaces. If the thickness of the sheet is less than 1.5% of the width of the mating surfaces, the sheet is weak and prone to cracking. If the thickness of the sheet is greater than 20% of the width of the mating surface, the sheet's rigidity is increased to such an extent that the result is essentially the same as if the ceramic sinter were directly joined to the metal. In this latter case, the ceramic sinter, even if it is brazed to the metal, will be easily ruptured by residual stresses that develop from thermal strain after the brazing operation.

In order to provide strong adhesion between ceramic and metal, it is preferred that the thin sheet of a ceramic material used as an insert satisfies one or more of the following requirements:

(i) it has a thermal expansion coefficient which is either comparable to that of the ceramic sinter or intermediate between those of the ceramic sinter and the metal;

(ii) it has a deflective or tensile strength that is at least 70% of the strength of the ceramic sinter.

These requirements can be readily met by forming thin sheet from the same material as that of the ceramic sinter.

The thin sheet and the ceramic sinter may be made of a variety of ceramic materials such as silicon nitride, alumina, zirconia, silicon carbide and boron nitride, as well as cermets wherein such ceramics and metallic phases are intimately dispersed one within the other on a microstructural scale. The advantages of the joint structure of the present invention are particularly great if it is used with silicon nitride and other ceramic materials having small thermal expansion coefficients. As already mentioned, the thin insert is preferably made of the same material as the ceramic sinter, so if the ceramic sinter is made of silicon nitride, it is desired that the thin insert is also composed of silicon nitride.

In order to ensure an even stronger adhesion between the ceramic sinter and the metal, a thin metal sheet may be inserted between the metal and the thin sheet of a ceramic material. Such a thin metal sheet may also be inserted between the ceramic sinter and the thin ceramic sheet. Therefore, in a preferred embodiment, an assembly of alternating thin ceramic sheets and thin metal sheets is interposed between the ceramic sinter and the metal. As with the thin ceramic insert, the thin metallic sheet is preferably made of a material that is capable of relaxing any residual stress that may develop from thermal strain after the brazing operation. Suitable materials are copper and other soft metals of proof stress in the range of under 15 kg/mm$^2$.

The ceramic sinter, metal and any other components of the joint structure in accordance with the present invention may be bonded by any conventional brazing fillers such as those based on silver, nickel, copper and aluminum metals and alloys. The ceramic sinter may be brazed to the metal after metallizing the mating surfaces of the ceramic sinter and the thin ceramic insert with the vapor of the metal that is formed by intense heating under vacuum. Alternatively, the mating surfaces may be metallized or brazed together by heating a mixture of an active metal such as titanium or zirconium and another metal such as silver, copper or nickel within a non-oxidizing atmosphere.

In accordance with the present invention, a ceramic sinter can be readily joined to a desired metal by a simple brazing technique. The joint structure of the present invention requires only a thin ceramic insert in addition to the members to be bonded and there is no need to use a metal insert having a thermal expansion coefficient close to that of the ceramic sinter; nor is it necessary to select a mating metal having a thermal expansion coefficient close to that of the ceramic sinter. Another advantage results from the fact that even ceramic sinters made of materials having low thermal expansion coefficients can be easily and strongly bonded to the mating metal without using costly tungsten as an insert. The insert used in the present invention is made of a ceramic, not a brittle and easily oxidizable metal such as tungsten. Therefore, the ceramic-metal composite prepared in accordance with the present invention is suitable for use in components of an internal combustion engine which are subjected to elevated temperatures and strong vibrations, such as gas turbine parts and the shaft connection in a turbocharger.

The following examples are provided for further illustrations of the present invention and should not be construed as limiting.

EXAMPLE 1

As shown in FIG. 1, a ceramic sinter 1 was bonded to a metal 2 together with a thin ceramic insert 3 using a brazing filler 4. Five samples of joint 5 were prepared by changing either the thickness of the ceramic insert 3 or the sintering method for obtaining the same.

The ceramic sinter 1 was a rod 15 mm in diameter and 40 mm long that was prepared by sintering a compact (86% $Si_3N_4$) at atmosphere pressure. The metal 2 was a Kovar rod of the same dimensions (15 mm and 40 mm). The ceramic insert 3 was made of $Si_3N_4$ and prepared by either normal or HIP sintering in the four sizes indicated in Table 1 below.

TABLE 1

| Insert | Sintering method | Dia. (mm) × Thickness (mm) |
|---|---|---|
| (a) | normal | 15 × 0.2 |
| (b) | normal | 15 × 0.5 |
| (c) | normal | 15 × 2.0 |
| (d) | normal | 15 × 4.0 |
| (e) | HIP | 15 × 0.5 |

In preparation for the brazing operation, the three mating surfaces, i.e., the bottom of the ceramic sinter 1 and both surfaces of the ceramic insert 3, were successively metallized with the vapors of zirconia powder (0.2 micron), chromium powder (0.2 micron) and silver powder (5.0 microns). By subsequent brazing with a pure silver filler 4 in a hydrogen furnace at 1,000° C., five joint samples A to E using ceramic inserts (a) to (e) were prepared.

A control joint F was prepared by directly brazing a ceramic sinter 1 to a metal 2. The two members were made of the same materials and had the same dimension as those used in preparing samples A to E. Again, the mating surface of the ceramic sinter 1 was metallized by successive deposition of the vapors of zirconium powder (0.2 micron), chromium powder (0.2 micron) and silver powder (5.0 microns). Thereafter, the ceramic sinter was brazed to the metal with a pure silver filler in a hydrogen furnace at 1,000° C.

Figure 2:
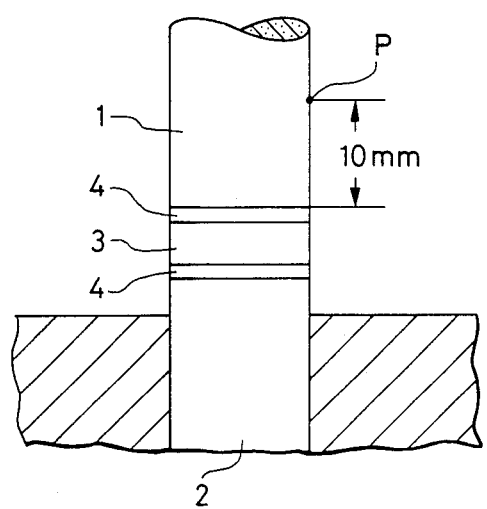
FIG. 2 is a side view illustrating an Izod impact test.

Samples A to F were then subjected to an Izod impact test for evaluating their bond strength at the joint. As shown in FIG. 2, this test was conducted by striking a point P 10 mm above the mating surface of the ceramic sinter 1 with the metal 2 fixed by a clamp. The test results are shown in Table 2 below.

TABLE 2

| Joint sample | Ceramic insert | Izod impact strength kg · cm | Failing part |
|---|---|---|---|
| A | (a) | 4.4 | ceramic sinter or insert |
| B* | (b) | 12.8 | ceramic sinter or insert |
| C* | (c) | 8.6 | ceramic insert |
| D | (d) | 5.1 | ceramic insert |
| E* | (e) | 14.1 | ceramic sinter or insert |
| F | none | 5.3 | ceramic sinter |

Each of the Izod impact strength values was the average of three test pieces for each sample. The samples with the asterisk were joints of the present invention.

Sample A used a ceramic insert 3 whose thickness was only 1.33% of its diameter and the Izod impact strength of this sample was 4.4 kg.cm which was even lower than the value for the control F using no ceramic insert. Sample B used a ceramic insert whose thickness was 3.3% of its diameter and the Izod impact strength of this sample was as high as 12.8 kg.cm. Too thin a ceramic insert is unable to relax the residual stress that arises from thermal strain after the brazing operation. The thickness of the ceramic insert must be at least 1.5% of its diameter, or the width of the mating surfaces.

Sample D using a 4 mm-thick ceramic insert also had a low Izod impact value (5.1 kg.cm) and was found to be even weaker than control F. On the other hand, sample C using a 2 mm-thick ceramic insert had an Izod impact value as high as 8.6 kg.cm. It is therefore clear that too thick a ceramic insert is also unable to provide a satisfactory bond strength and that its thickness should not be more than 20% of the width of the mating surfaces. An excessively thick ceramic insert has such a high rigidity that the joint is virtually the same as the direct bonding of the ceramic sinter to the metal, and the ceramic sinter is prone to cracking as a result of the residual stress that arises from a thermal expansion mismatch after the brazing operation.

Of the six samples tested, sample E had the highest Izod impact strength of 14.1 kg.cm. The ceramic insert used in this sample had the same dimensions as those of the insert used in sample B, but (e) was prepared by the HIP sintering process whereas (b) was by normal sintering. Of these two sintering methods, the HIP process produces a greater deflective strength. It is therefore understood that the use of a stronger ceramic insert is recommended for producing a joint having a greater bond strength.

EXAMPLE 2

Two types of joints were prepared. One type, generally indicated at 16 in FIG. 3, was composed of a ceramic sinter 11 and a metal 12 which were bonded, together with a thin ceramic insert 13 and a thin metal insert 14, by using a brazing filler 15. The other type, generally indicated at 27 in FIG. 4, was composed of a ceramic sinter 21 and a metal 22 which were bonded by using a brazing filler 26 together with a thin ceramic insert 23 sandwiched between two thin metal inserts 24 and 25.

Each of the ceramic sinters 11 and 21 was a rod 15 mm in diameter and 40 mm long that was prepared from a ceramic powder (86% $Si_3N_4$) by the normal sintering. Each of the metals 12 and 22 was a rod of the same dimensions as shown above and was made of a carbon steel (JIS-S 45C). Four inserts which were made of the materials shown in Table 3 below and which had the dimensions listed were used in fabricating the joints 16 and 27.

TABLE 3

| Insert | Material | Dia. (mm) × Thickness (mm) |
|---|---|---|
| (b)* | $Si_3N_4$ (normal sintered) | 15 × 0.5 |
| (f) | $Al_2O_3$ | 15 × 0.5 |
| (g) | Cu | 15 × 0.3 |
| (h) | Cermet (Tic—Ni) | 15 × 0.5 |
| (i) | Ni | 15 × 0.3 |
| (j) | Cermet (WC—Co—TaC) | 15 × 2.0 |

*Same as (b) used in Example 1.

The six inserts (b), (f), (g), (h), (i) and (j) were variously combined to prepare six joint samples G to J, L and M in a hydrogen furnace (900° C.) by bonding with a brazing filler 15 or 26 made of a 72% Ag/28% Cu eutectic. As in Example 1, the mating surfaces of (b) and (f) and the bottom of the ceramic sinter 11 (or 21) were metallized by successive deposition of the vapors of zirconium powder (0.2 micron), chromium powder (0.2 micron) and silver powder (5.0 microns) prior to the brazing operation. The cermet insert (h) was composed of titanium carbide and nickel.

Figure 3:
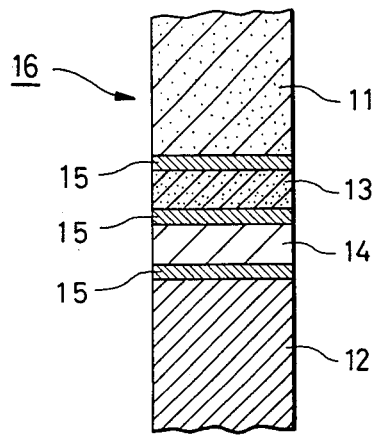
FIG. 3 is a cross section illustrating the structure of the joints prepared and tested in Examples 2 and 3.
Figure 4:
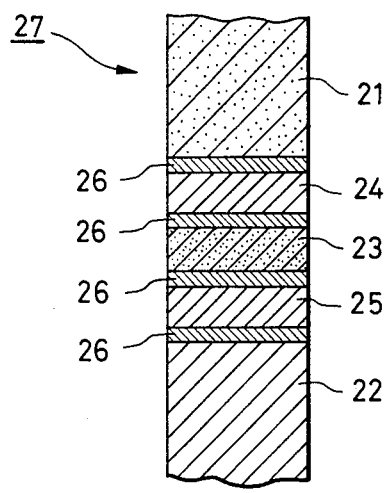
FIG. 4 is a cross section illustrating the structure of the joint prepared and tested in Example 2.

Joints G and H were of the type 16 which used two inserts 13 and 14 as shown in FIG. 3. Joint G used insert (b) as 13 and insert (g) as 14. Joint H used insert (f) as 13 and insert (g) as 14. Joints I and J were of the type 27 which used three inserts as shown in FIG. 4. Joint I used insert (g) as each of 24 and 25, and insert (b) as 23. Joint J used insert (g) as each of 24 and 25, and insert (h) as 23. As in Example 1, a control joint K was prepared by the same method of bonding as shown above except that the ceramic sinter 11 (or 21) was directly joined to the metal 12 or (22).

Joints L and M were of the type 27 using three inserts 23, 24 and 25 as shown in FIG. 4. Joint L used insert (i) from Table 3 as 24 and 25 and insert (h) from Table 3 as 23. Joint M used insert (o) from Table 3 as 24 and 25 and insert (j) from Table 3 as 27.

The so prepared joint samples G to M were checked for their bond strength by conducting an Izod impact test as in Example 1. The test results are shown in Table 4 below.

TABLE 4

| Joint | Izod impact strength kg · cm | Failing part |
|---|---|---|
| G | 13.9 | ceramic sinter or $Si_3N_4$ insert |
| H | 3.7 | $Al_2O_3$ insert |
| I | 14.7 | $Si_3N_4$ insert |
| J | 11.9 | ceramic sinter |
| K | 0 | brazing filler |
| L | 13.3 | ceramic sinter |
| M | 15.2 | ceramic sinter |

The comparison between the results obtained in the two Examples reveals the following.

First, the comparison between joints B and G shows that if the material of the ceramic inset is the same, a greater bond strength is obtained by combining the ceramic insert with a thin metal insert. The results with joint I shown the effectiveness of increasing the number of the metal inserts to be combined with the ceramic insert.

Joint H used an alumina insert whose deflective strength was about half that of the $Si_3N_4$ based ceramic sinter, and the Izod impact value of this joint was only 3.7 kg.cm. Therefore, as already pointed out in Example 1, better results are obtained by using a thin ceramic insert with a greater deflective strength, and it is preferred that the insert used has a deflective strength which is at least 70% of that of the ceramic sinter.

The ceramic insert used in Joint J was a cermet prepared by sintering a mixture of titanium carbide and nickel. Since this joint had an Izod impact value of 11.9 kg.cm, it can be said that the thin ceramic insert which is an essential component of the joint structure of the present invention may be composed of a cermet wherein ceramic and metallic phases are intimately dispersed one within the other on a microstructural scale.

EXAMPLE 3

A joint having the same structure as that of joint G prepared in Example 2 was fabricated in this Example by using substantially the same method except for the brazing of the ceramic sinter to a ceramic insert.

Titanium, silver and copper powders (−250 mesh, ≧99% pure) was intimately mixed in respective proportions of 5, 70 and 25 wt%. To the mixture a suitable amount of a binder (Butyl Carbitol ®) and 5 wt% of ethyl cellulose were added. The individual components were wet-mixed for 1 hr by means of alumina balls in an alumina pot using acetone as a solvent. The resulting brazing filler was screen-printed onto the mating surface of the ceramic sinter to form a filler coat in a thickness of not more than 100 microns.

A ceramic insert which was the same as insert (b) was joined to the so treated ceramic sinter. After removing the binder at an ambient temperature of 500° C., the assembly was heated for 3 minutes at 930° C. at a pressure on the order of $10^{-5}$ Torr, thereby activating the titanium so as to braze the two ceramic members. The metal insert was brazed to the steel by the same method as used in preparing joint G. The thus prepared joint had an Izod impact value of 13.4 kg.cm.

The above results show that a joint prepared by brazing the ceramic sinter to the ceramic insert by the activated metal process which involves substantially no surface preparation has a bond strength comparable to that achieved by the usual method involving metallization by the vapor deposition of zirconia, chromium or silver on the mating surfaces of the ceramic members.

The joints prepared by Examples 1 to 3 used ceramic sinters made of silicon nitride. It should be understood that equally good results are obtained by using sinters made of common ceramic materials such as alumina, zirconia, silicon carbide and boron nitride.

The metal insert combined with the ceramic insert in Example 2 was made of copper. This metal insert may be made of any other soft metal, such as nickel. The purpose of using a soft metal having low proof stress is to reduce the residual stress that arises from thermal strain after the brazing operation, by plastic deformation of the soft metal.

Therefore, the ceramic insert preferably has a thermal expansion coefficient equal to or slightly higher than that of the ceramic sinter. The thermal expansion coefficient of the ceramic insert can be modified by incorporating a suitable additive depending upon the ceramic material used. For example, alumina may be added to modify the thermal expansion coefficient of silicon nitride.

As already mentioned, the greater the deflective strength of the ceramic insert, the higher the bond strength that is exhibited by the joint. This object may be attained by using a material that differs from the material of the ceramic sinter. However, with respect to thermal expansion coefficient, a similar material is preferably used for both the ceramic insert and the ceramic sinter, and a greater deflective strength should be obtained by employing a different sintering technique, for example, the HIP process.

The brazing filler materials that can be used in the present invention are not limited to those used in Examples 1 to 3 and nickel-, copper- and aluminum-base fillers may also be used.

Figure 5:
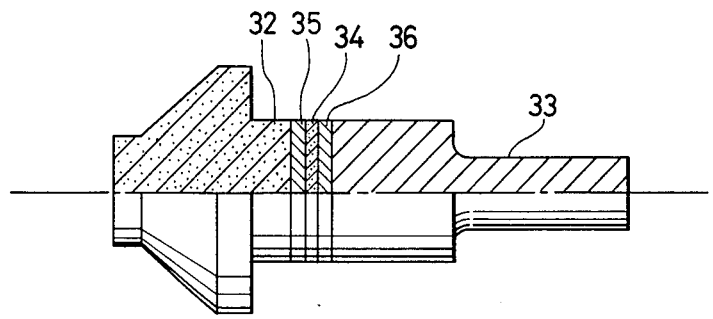
FIGS. 5 and 6 are longitudinal views showing the upper half of shafts that use the ceramic-metal joint structure in accordance with the present invention.
Figure 6:
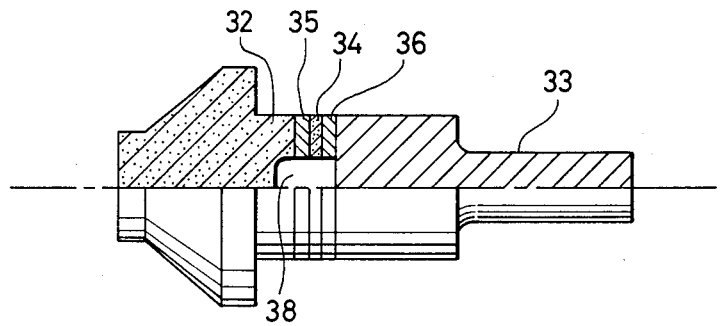

The joint structure in accordance with the present invention may be used in a turbine shaft as shown in FIGS. 5 and 6. The turbine shaft shown in FIG. 5 consists of a ceramic shaft 32 which is made of a 86% $Si_3N_4$ sinter and connected to a metal shaft 33 on the compressor side which is composed of a chromemolybdenum steel (JIS-SCM 435). The two shafts are connected together by a joint which, as in the case of joint G prepared in Example 2, is composed of a thin $Si_3N_4$ insert 34 that is sandwiched between two thin Cu inserts 35 and 36. The turbine shaft shown in FIG. 6 is the same as the shaft in FIG. 5 except that a hollow portion 38 is formed both in the ceramic shaft 32 and in the joint. The purposes of this hollow portion are three-fold: it reduces the weight of the turbine shaft; it provides an increased heat insulation; and it ensures a greater strength for the shaft by minimizing the residual stress that develops after the brazing operation.

Therefore, the joint structure of the present invention can be effectively incorporated in a turbine shaft which is exposed to high temperatures and constant strong vibrations. The turbine shaft incorporating the present invention features great durability since the joint has high bond strength and is sufficiently protected against failure due to residual stresses.

Figure 7:
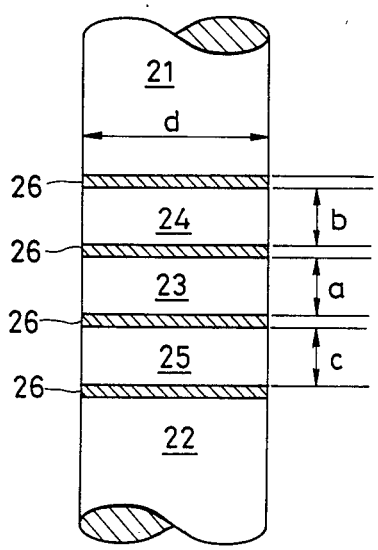
FIGS. 7, 8 and 9 are perspective side views illustrating the structure of the joint in accordance with the present invention.

FIG. 7 is a perspective side view of a power-transmitting joint 77 analogous to the joint 27 of FIG. 4. Joint 77 comprises a ceramic shaft 71, metal output shaft 72 and an intermediate insert including layers 23, 24 and 25 as in FIG. 4. Layers 23, 24 and 25 are bonded to one another by brazing joints 26, and the intermediate layer is bonded to shafts 71, 72 by brazing joints 26. The respective thicknesses a, b and c of layers 23, 24 and 25 are from about 1.5% to about 20% of diameter d of shaft 71.

Figure 8:
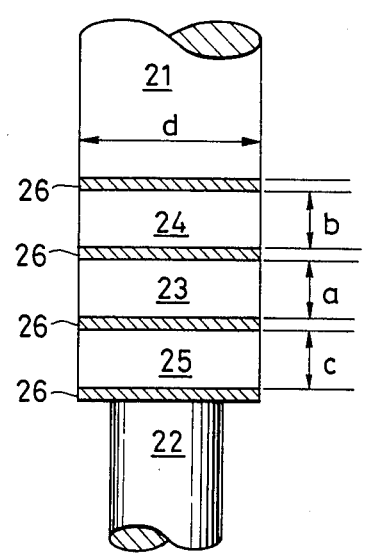

FIG. 8 is a perspective side view of a power-transmitting joint 87 comprising ceramic shaft 81, metal output shaft 82 and an intermediate insert including layers 23, 24, 25. As in FIG. 7, all components are bonded by brazing joints 26. Power-transmitting shaft 82 has a diameter d' less than the diameter d of shaft 81. The respective thicknesses a, b and c of layers 23, 24 and 25 are from about 1.5% to about 20% of diameter d.

Figure 9:
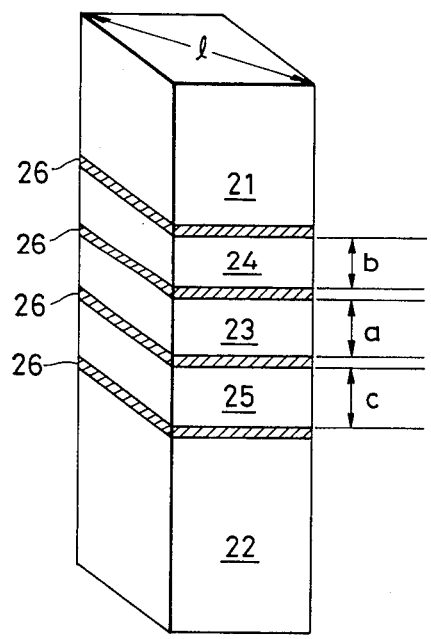

FIG. 9 is a perspective side view of power-transmitting joint 97 comprising ceramic shaft 91, output shaft 92 and an intermediate insert including layers 93, 94 and 95 (corresponding to layers 23, 24 and 25 of FIG. 4). As in FIG. 7, all components are bonded by brazing joints 96. The embodiment of FIG. 9 is similar to that of FIG. 7 in all respects except that its cross section is a four-sided polygon. Thicknesses a, b and c of layers 93, 94 and 95 are between about 1.5% and about 20% of diagonal 1.

We claim:

1. A power-transmitting ceramic to metal joint structure comprising:
    a first shaft consisting essentially of a sintered ceramic material, one portion of said first shaft defining a first mating surface;
    an intermediate insert consisting essentially of a sintered ceramic material, said insert having two opposite insert mating surfaces, said insert having a thickness between said opposite insert mating surfaces in the range of from 1.5 to 20% of a distance defined by the cross section of said first mating surface and a flexural strength of not less than about 70% of the sintered ceramic material comprising said first shaft;
    a second shaft consisting essentially of metal, one portion of said second shaft defining a second mating surface; and
    brazing filler means affixing said first mating surface to one of said insert mating surfaces and said second mating surface to the opposite insert mating surface, said mating surfaces being affixed in abutting relationships.

2. A ceramic to metal joint structure according to claim 11 wherein the first shaft and the intermediate insert are made of the same ceramic material.

3. A ceramic to metal joint structure according to claim 2 wherein the ceramic material is principally composed of silicon nitride.

4. A ceramic to metal joint structure according to claim 11 wherein the ceramic material of which the intermediate insert is made is a cermet composed of at least one ceramic selected from the group consisting of titanium nitride, titanium carbide and tungsten carbide, and at least one metal selected from the group consisting of nickel, cobalt, molybdenum and titanium.

5. A ceramic to metal joint structure according to claim 1, further comprising an intermediate metal insert disposed between and fixed to said first shaft and said intermediate insert.

6. A ceramic to metal joint structure according to claim 1, further comprising an intermediate metal insert disposed between and fixed to said intermediate insert and said second shaft.

7. A ceramic to metal joint structure according to claim 1, further comprising a first intermediate metal insert disposed between and fixed to said first shaft and said intermediate insert and a second intermediate metal insert disposed between and fixed to said intermediate insert and said second shaft.

8. A ceramic to metal joint according to claim 7, wherein said first and second intermediate metal inserts are selected from the group consisting of Ni and Cu.

9. A ceramic to metal joint according to claim 7, wherein said first and second intermediate metal inserts comprise a soft metal having a proof stress in the range less than about 15 kg/mm$^2$.

10. A ceramic to metal joint according to claim 1, further comprising a hollow portion extending from said first shaft to said second shaft.

11. A ceramic to metal joint according to claim 1, wherein said first shaft is a driving shaft, and wherein said second shaft is a power output shaft.

12. A power-transmitting ceramic to metal joint structure comprising:
   a first shaft consisting essentially of a sintered ceramic material, one portion of said first shaft defining a first mating surface:
   an intermediate insert consisting essentially of a sintered ceramic material, said insert having two opposite insert mating surfaces, said insert having a thickness between said opposite insert mating surfaces in the range of from 1.5 to 20% of a distance defined by the cross section of said first mating surface and a flexural strength of not less than about 70% of the sintered ceramic material comprising said first shaft;
   a second shaft consisting essentially of metal, one portion of said second shaft defining a second mating surface; and
   brazing filler means affixing said first mating surface to one of said insert mating surfaces and said second mating surface to the opposite insert mating surface, said mating surfaces being affixed in abutting relationships, wherein said intermediate insert has a thermal expansion coefficient in the range from about a thermal coefficient of the first shaft to about a thermal coefficient of the second shaft.

* * * * *